United States Patent
Dierks et al.

(10) Patent No.: US 8,407,885 B2
(45) Date of Patent: Apr. 2, 2013

(54) HAND-OPERATED CRIMPING TOOL

(75) Inventors: Christoph Dierks, Detmold (DE);
Guenther Hanning, Detmold (DE)

(73) Assignee: Weidmueller Interface GmbH & Co. KG, Detmold (DE)

( * ) Notice: Subject to any disclaimer, the term of this patent is extended or adjusted under 35 U.S.C. 154(b) by 229 days.

(21) Appl. No.: 13/082,675

(22) Filed: Apr. 8, 2011

(65) Prior Publication Data
US 2011/0252633 A1 Oct. 20, 2011

(30) Foreign Application Priority Data
Apr. 17, 2010 (DE) ............ 20 2010 005 761 U

(51) Int. Cl.
*B23P 19/04* (2006.01)
*B23P 23/00* (2006.01)

(52) U.S. Cl. ............ 29/709; 29/566.1; 29/750; 29/753; 29/758; 29/268

(58) Field of Classification Search .......... 29/407.05, 29/407.1, 700, 709, 750, 751, 753, 758, 242, 29/268, 283.5, 284, 566, 566.1, 566.4
See application file for complete search history.

(56) References Cited

U.S. PATENT DOCUMENTS

| | | | |
|---|---|---|---|
| 7,055,361 B2 * | 6/2006 | Hetland et al. ........... | 72/409.06 |
| 8,296,924 B2 * | 10/2012 | Dierks et al. ............ | 29/566.4 |
| 2003/0015076 A1 | 1/2003 | Tanaka | |
| 2005/0223548 A1 * | 10/2005 | Chen ....................... | 29/747 |

FOREIGN PATENT DOCUMENTS

| | | |
|---|---|---|
| DE | 19842122 A1 | 3/2000 |
| DE | 202010005766 U1 | 12/2010 |
| EP | 1950588 A1 | 1/2008 |
| EP | 1972973 A2 | 9/2008 |
| EP | 2264495 A1 | 12/2010 |
| JP | 9061667 A | 3/1997 |
| WO | 0241059 A1 | 5/2002 |

* cited by examiner

*Primary Examiner* — Jermie Cozart
(74) *Attorney, Agent, or Firm* — Lawrence E. Laubscher, Sr.; Lawrence E. Laubscher, Jr.

(57) ABSTRACT

A monitoring device for monitoring the operation of a hand-held pliers-type crimping tool, including a pair of pivotally connected handles for displacing a pair of crimping dies between open and closed crimping positions, a support seat connected with one of the handles for supporting at least one plug terminal between the crimping dies, a transport tool for transporting a plug terminal to a seated position on the support seat, and a counter arrangement on the transport tool for producing a signal that is a function of the number of displacements of the handles from the open position toward the closed position. The transport tool includes a housing, an electronic circuit including a counter mounted in the housing, a transport pin extending from the housing for insertion within one end of a hollow plug terminal, and a signal transmitting pin parallel with the transport pin.

6 Claims, 14 Drawing Sheets

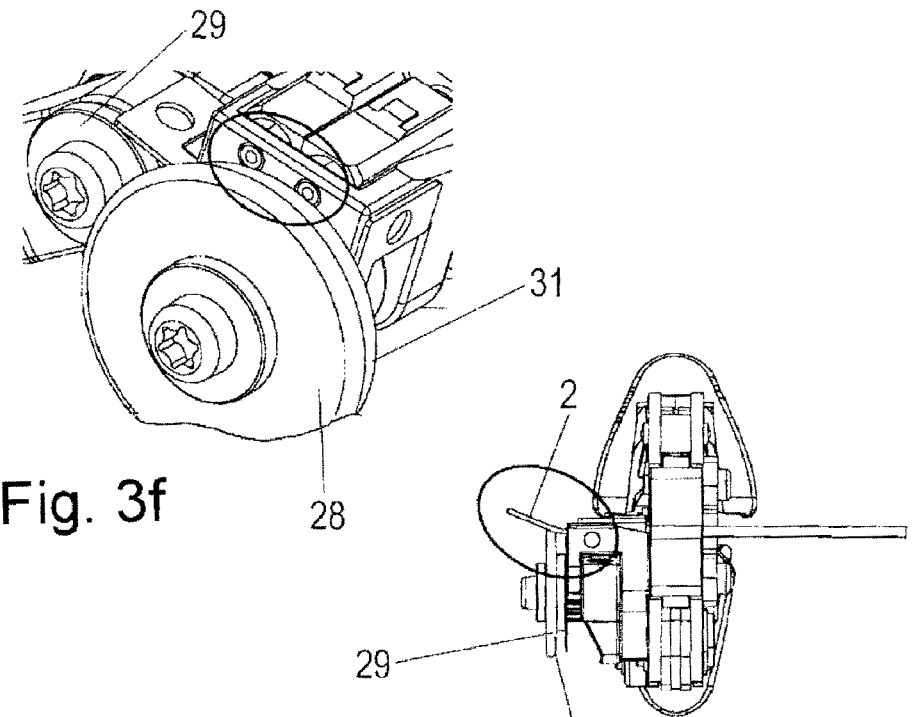
Fig. 3f
Fig. 3g
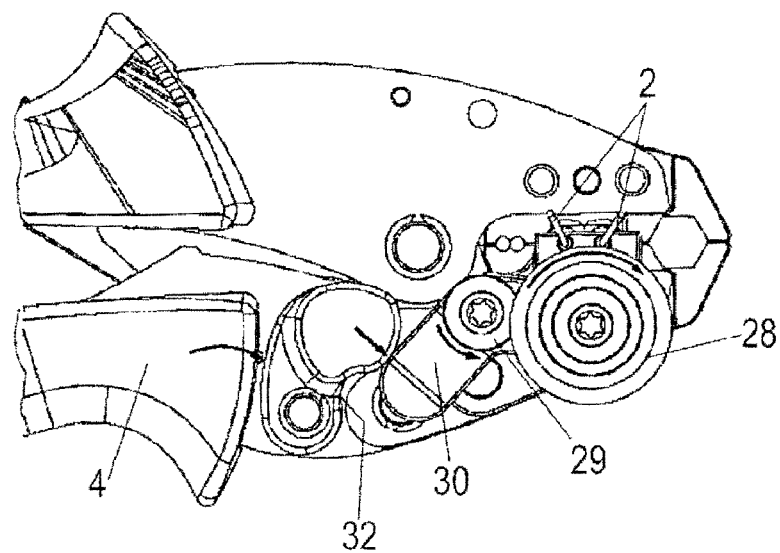
Fig. 3h

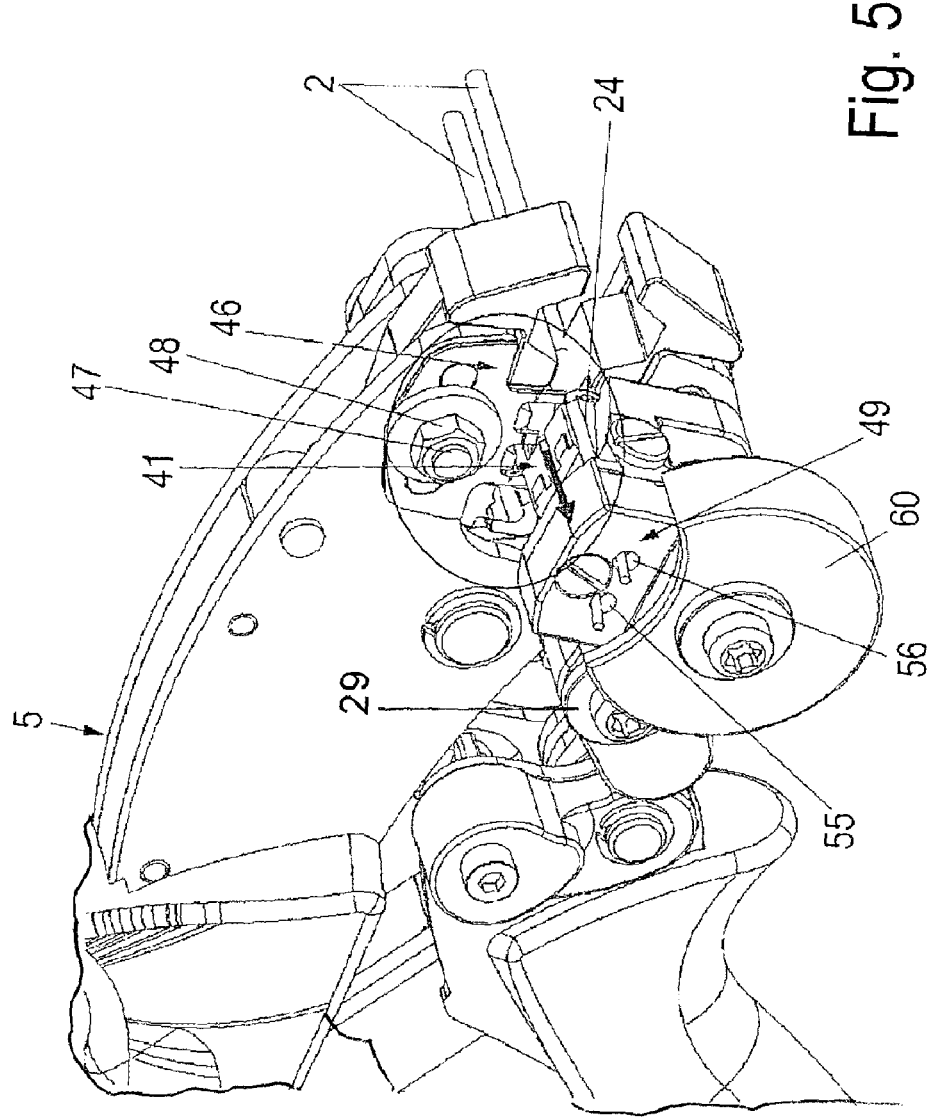

HAND-OPERATED CRIMPING TOOL

BACKGROUND OF THE INVENTION

1. Field of the Invention

A monitoring device for monitoring the operation of a hand-held pliers-type crimping tool, including a pair of pivotally connected handles for displacing a pair of crimping dies between open and closed crimping positions, a support seat connected with one of the handles for supporting at least one plug terminal between the crimping dies, a transport tool for transporting a plug terminal to a seated position on the support seat, and a counter arrangement on the transport tool for producing a signal that is a function of the number of displacements of the handles from the open position toward the closed position.

2. Description of Related Art

This invention relates to a manipulating device for a tool, in particular, a pliers-type tool for crimping a connector, terminal or the like to a conductor. Such tools are known as such, for example, from DE 198 42 122 C2 or DE 100 56 780 A1.

Of course, the known tools require further optimization, first of all in terms of their handling and operating safety. The purpose of the present invention is to solve this problem.

SUMMARY OF THE INVENTION

Accordingly, a primary object of the present invention is to provide apparatus for monitoring the operation of a hand-held pliers-type crimping tool, including a pair of pivotally connected handles for displacing a pair of crimping dies between open and closed crimping positions, a support seat connected with one of the handles for supporting at least one plug terminal between the crimping dies, a transport tool for transporting a plug terminal to a seated position on the support seat, and a counter arrangement on the transport tool for producing a signal that is a function of the number of displacements of the handles from the open position toward the closed position.

According to a more specific object of the invention, the transport tool includes a housing, an electronic circuit including a counter mounted in the housing, a transport pin extending from the housing for insertion within one end of a hollow plug terminal, and a signal transmitting pin parallel with the transport pin. A signal is sent to the counter via the signal pin when the lug terminal is seated on the seat, and the handles are displaced form the open position toward the closed position.

Created here is a manipulating device, which is so designed that by using it, one can insert the plugs into a seat of the tool and/or which is designed for the purpose of putting out an information item which is directly or indirectly related to the number of cuts that have been done with the tool. The manipulating device definitely makes it easier to insert the plug or plugs into the seat(s) intended for them, in particular, if these seats are difficult to access.

If an electronic counting device is provided, which either directly senses a cutting process or which from another signal—for example, from the sensing of the motion of another suitable mobile part of the manual tongs—makes it possible to draw certain or probable conclusions as to such a cutting process, then one can in a simple manner supply an information item, which permits conclusions as to the conformation of the knife views for trimming the lightwave conductors without any need for supplying a meter that is expensive in terms of design and construction and mechanical operation for the purpose of counting the number of cuts.

It is particularly advantageous to combine the two functions of simple and safe handling with the manipulating device used for inserting the conductors and with the counting function.

The invention also creates a tool with such a manipulating device. The invention furthermore creates an electronic meter integrated into the tool, which meter is designed to put out an information item that is directly or indirectly related to the number of cuts that have been done with the tool.

BRIEF DESCRIPTION OF THE DRAWINGS

Other objects and advantages of the invention will become apparent from a study of the following specification, when viewed in the light of the accompanying drawing, in which:

FIGS. 3a-3i are detailed perspective views of the apparatus of FIGS. 1a and 1b;

FIG. 5 is a detailed perspective view of the other side of the apparatus of FIG. 4;

FIG. 6b is a sectional view of the portion identified by the elliptical portion A of FIG. 6a;

FIG. 7b is a sectional view of the area indicated by the elliptical circle B in FIG. 7a;

DETAILED DESCRIPTION OF THE INVENTION

Figure 1A:
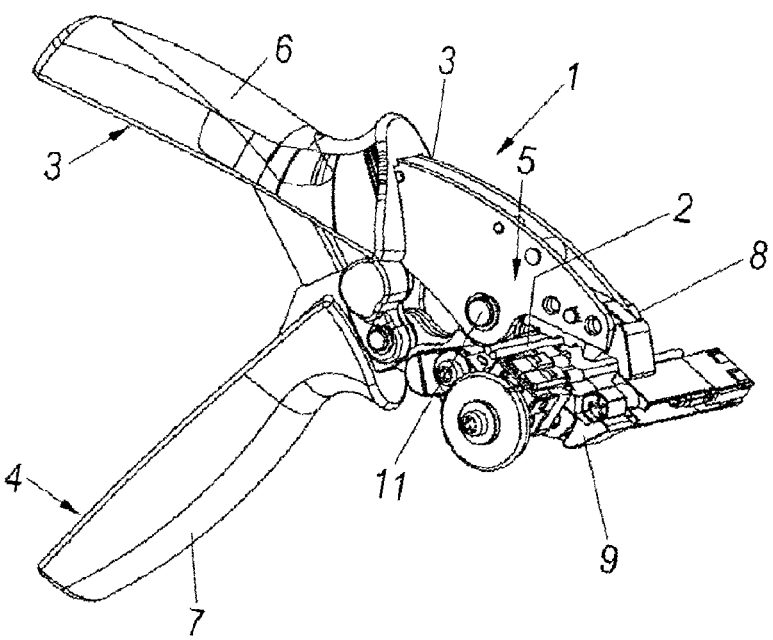
FIGS. 1a and 1b are left and right front perspective views of a crimping tool in accordance with the present invention.
Figure 1B:
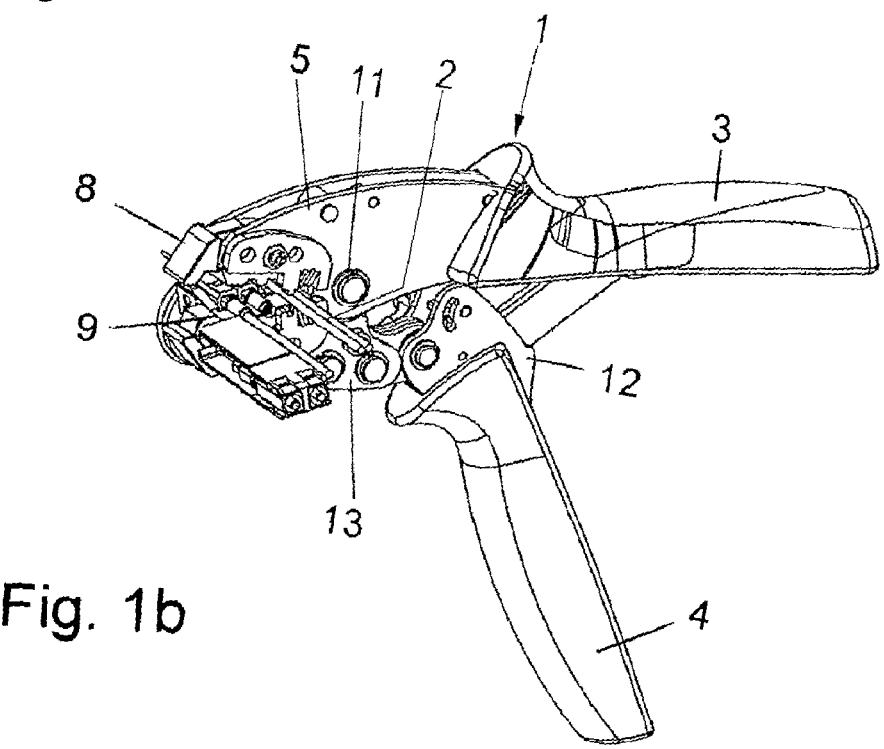

Referring first more particularly to FIGS. 1a and 1b, the pliers-type tool 1 is provided for the processing, especially packaging, of light-wave transmitting optic fiber conductors 2, in particular, for the processing, especially packaging, of Polymer Optical Fibers (POF), which, for example, are used for the transmission of light waves.

The tool is particularly designed for the purpose of packaging two light-wave conductors 2 with a plug-in device (in particular, so-called POF Duplex light-wave conductors and plug-in devices), whereby one particular feature consists of the fact that the packaging with the inventive tool can be so done that, as a rule, there is no further need for any subsequent polishing of the light-wave conductor cutting surface.

The tool for this purpose in the embodiment shown in FIG. 1 offers devices for performing the functions of "stripping the POF light-wave conductors," "crimping the plugs upon the POF light-wave conductors," "cutting the POF light-wave conductors to the right length" and "crimping a traction relief on the plug." It might be noted that it is particularly advantageous to combine all of these functions in one tool. But in the context of the invention, it is not mandatory that all of these functions be integrated onto one single manual tong.

The tool 1, shown in FIG. 1a, is fashioned as manual tongs. It has two gripper handles 3, 4 that can be moved with relation to each other and a pincers body 5. The gripper handles 3, 4 are provided with handle shells 6, 7.

Pincers body 5 furthermore has two mutually relatively movable, in this case, pivotable operating jaws 8, 9, which can be pivoted into an open position and into a closed position and which by means of their interplay form a pliers-type tool.

In the present case, one of the treatment jaws 8 is coupled rigidly with one of the gripper handles 3; it is preferably made integrally with the latter. The other treatment jaw 9, on the other hand, is moved pivotally on a pivot shaft 11 on the first treatment jaw 8.

Gripper handles 3 are connected movably via pivot shaft 11 with the clamping jaw 13 by means of which the closing and opening movement is performed. The clamping jaw is driven by toggle joint means 12 consisting of push arm 14, gripper handle 4, link 13, and clamping jaw 9.

When the two gripper handles 3, 4 are pressed together by hand, the second gripper handle 4 acts on rotary bearing 15, as a result of which, the toggle joint means 12, made up of push arm 14, gripper handle 4, link 13, and clamping jaw 9, is tensioned, so that the clamping link 13 is swung around the rotary bearing 11, as a result of which, the treatment jaws 8, 9 move toward each other toward the closed position.

Figure 2A:
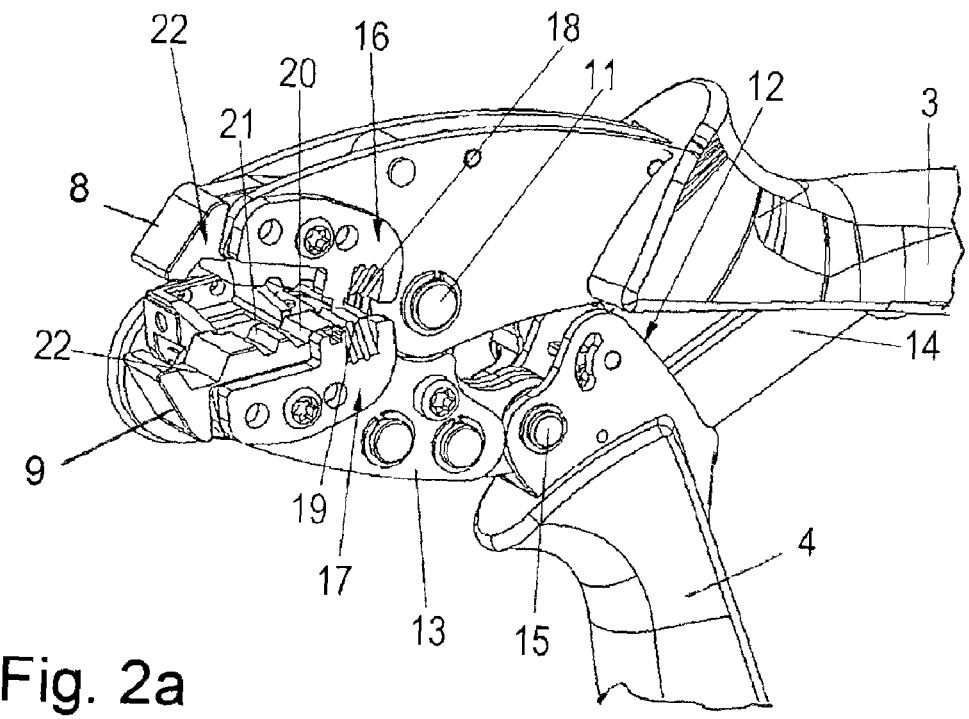
FIGS. 2a-2d are detailed perspective views of the apparatus of FIGS. 1a and 1b.

Various tools are mounted in or on the treatment jaws 8, 9. First, as shown in FIGS. 2*a* and 3*a*, these tools comprise two stripping knives 16, 17 which are placed laterally upon the treatment jaws 8, 9 and which have the corresponding cutting areas 18, 19.

Figure 3A:
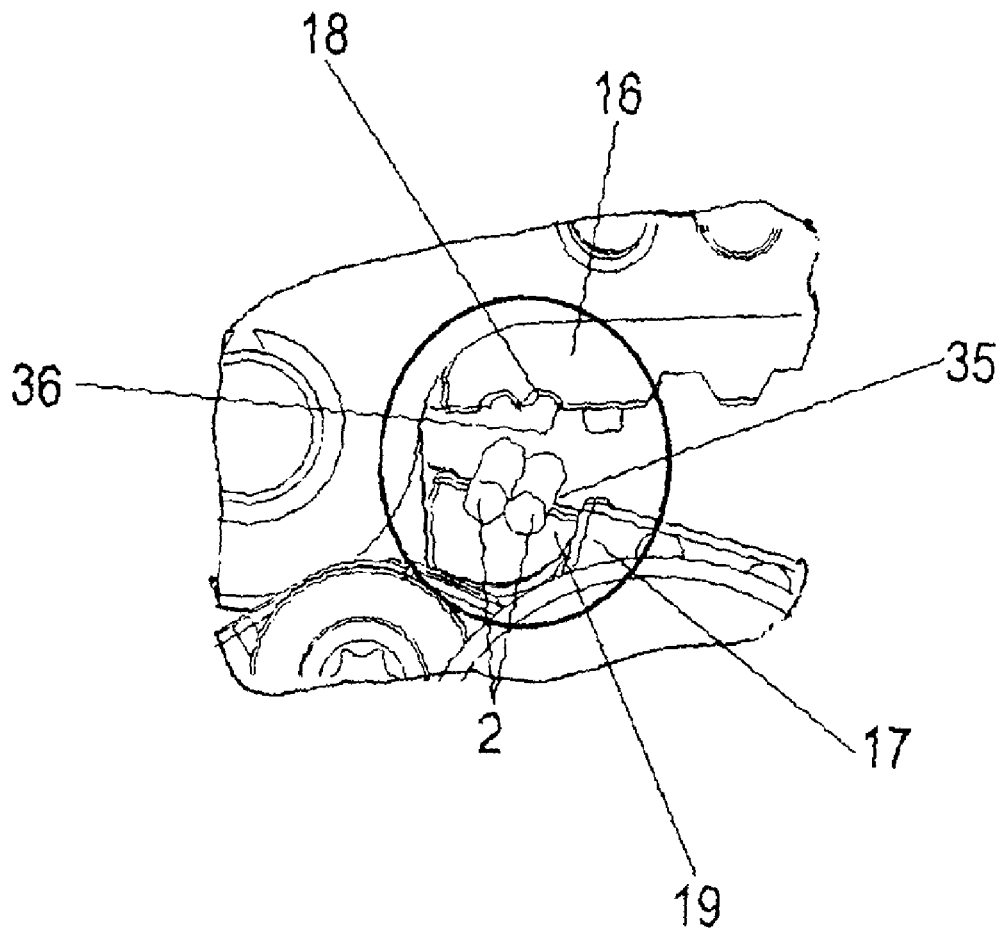
Figure 3B:
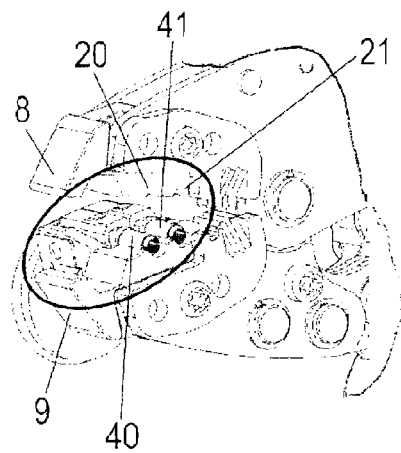
Figure 3C:
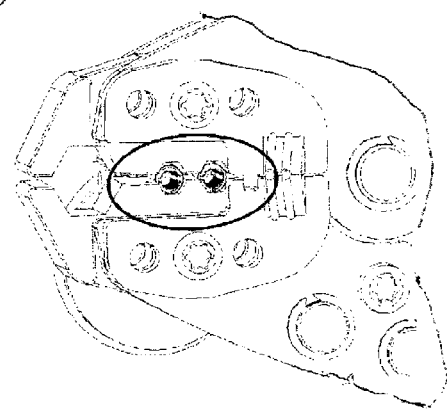

These cutting areas 18, 19 are so dimensioned that a cut is made in light-wave conductors 2, which are inserted into the cutting areas 18, 19, which cut makes it possible to strip an enveloping jacket off the actual interior glass fiber line of the light-wave conductors 2 (see also FIG. 3*a*).

As a result of the closing of the tool head/bit of tongs, light-wave conductors 2 in the process are positioned in a correct place in guides 35, 36 (FIG. 3*a*) in the upper die and in the lower die or in the treatment cheeks and are fixed in position there.

It is not necessary to strip the light-wave conductors 2 to a precisely measured length because the final severing of the light-wave conductors 2 takes place only during the following crimping process during which they are automatically cut to the correct length.

This final severing of light-wave conductors 2 takes place here advantageously during the same closing motion of the pincers head during which the crimping of the light-wave conductor ends also takes place.

The tools on the manual tongs furthermore comprise several crimping dies 20, 21 as well as 22 in the mutually facing surfaces of the treatment jaws 8, 9 (FIG. 2*a*). Using the two crimping dies 20, 21, the two plugs or terminals 40, 41 of the plug-in device (see FIGS. 3*b* to 3*e*) are crimped upon the light-wave conductors 2. On the other hand, the third crimping die 22 is intended for crimping a traction relief sleeve 42 upon the plug housing 43 into which the two plugs or terminals 40, 41 are stuck (see FIG. 3*i*).

Attached upon the side surface of the treatment cheeks 8, 9 facing away from the stripping knives 16, 17, there is furthermore made a seat area 23 to receive a plug housing that has a stop 24. This can be seen particularly clearly in FIG. 2*c*. Stop 24 has a number of plugs 40, 41 and light-wave conductors 2 that are to be treated, which number corresponds to the number of passage openings 25, 26. Stop 24 furthermore is so contoured that the two plugs 40, 41 can be inserted only in the position that they have to assume for further treatment because, after crimping, turning the plug 40, 41 around the light-wave conductor axis is no longer possible.

To fix plugs 40, 41 in the tool or in the crimping dies 20, 21, the latter is slightly closed, whereupon the two lightwave conductors 2 are introduced into the plugs so that they will protrude out front out of the passage openings 25, 26. By closing the tool, the two plugs are then crimped upon the POF light-wave conductors 2.

On the side of these passage openings 25, 26, which face away from stop 24, there is furthermore fashioned a length-trimming mechanism 27, which is used for adjusting the length of the light-wave conductors during and after the crimping with the help of the two crimping dies 20, 21.

Figure 2B:
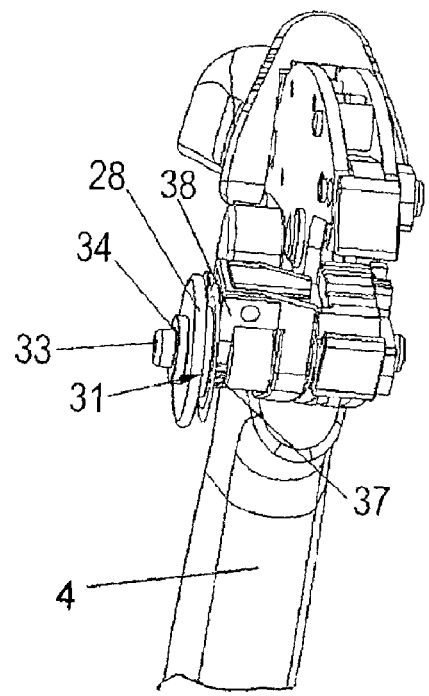
Figure 2C:
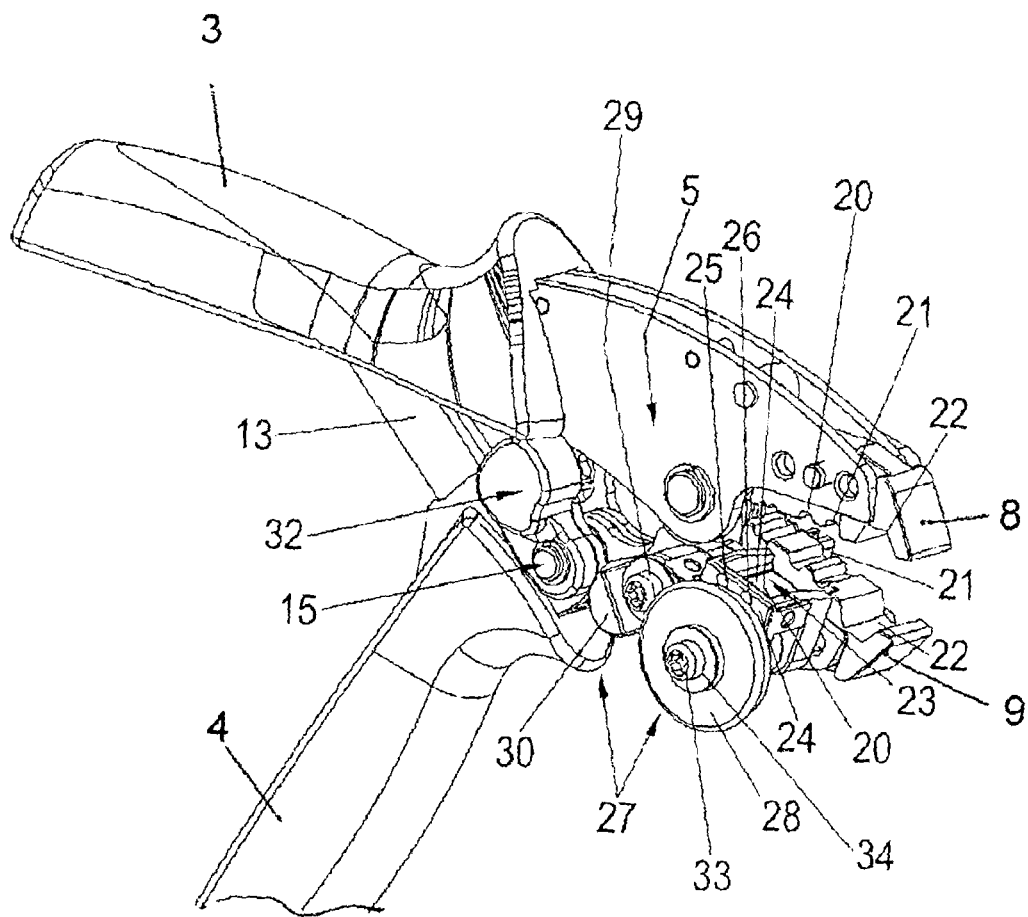

The length-trimming mechanism 27 comprises a pressure disk 28, which is mounted laterally and at a distance from stop 24 and which has a slanted outer circumferential surface 31 (FIG. 2*b*). Pressure disc 28 can be screwed upon the lower treatment jaw 9 with a screw 33 and a washer 34. Pressure disc 28 itself can be rotatably mounted on the screw.

The length-trimming mechanism 27 furthermore has a rotatable blade 29, which is rotatably positioned itself upon a lever arm 30 and which by virtue of its arrangement at the end of the pivotal lever arm 30 can be so moved longitudinally along a circle arc segment that it can be used to sever any ends of the light-wave conductors 2 that might still stick out of the passage openings 25 26 during or after the crimping.

By virtue of its arrangement on the lever arm 30, revolving blade 29 can be swung in a gap area (see FIG. 2*b*) between pressure disc 28 and stop 24. Lever arm 30 itself is pivoted because an end of an actuating lever 32 acts upon it, which lever is firmly connected with the gripper finger and which again acts upon lever 30 during or after the crimping in the course of the pressing together of handles 3, 4 toward the end of the crimping process (FIGS. 3*f, g, h*).

Handle 4 pivots actuating lever 32 and the latter, in turn, pivots lever 30 along with rotary blade 29, which in this way is pressed against the ends of the light-wave conductors 2 that protrude through the passage openings 25, 26, and which cuts those ends off.

During the insertion of the plug into stop 24, an elastically positioned end of the plugs 40, 41 bumps into the revolving blade 29 so that the tolerances of the individual parts of the plugs 40, 41 are balanced out and so that plugs 40, 41 will rest upon revolving blade 29, so to speak, without any play.

Figure 3D:
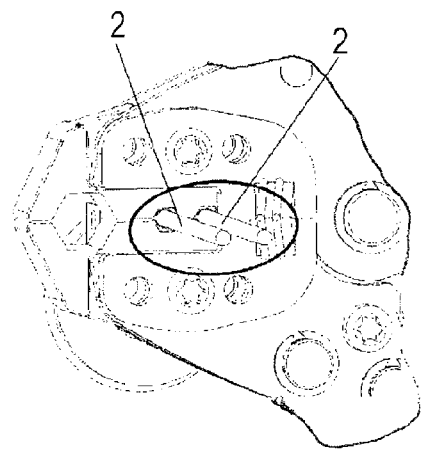
Figure 3E:
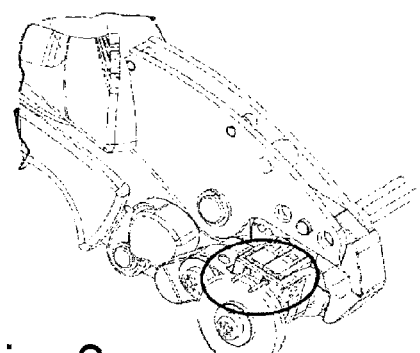
Figure 3I:
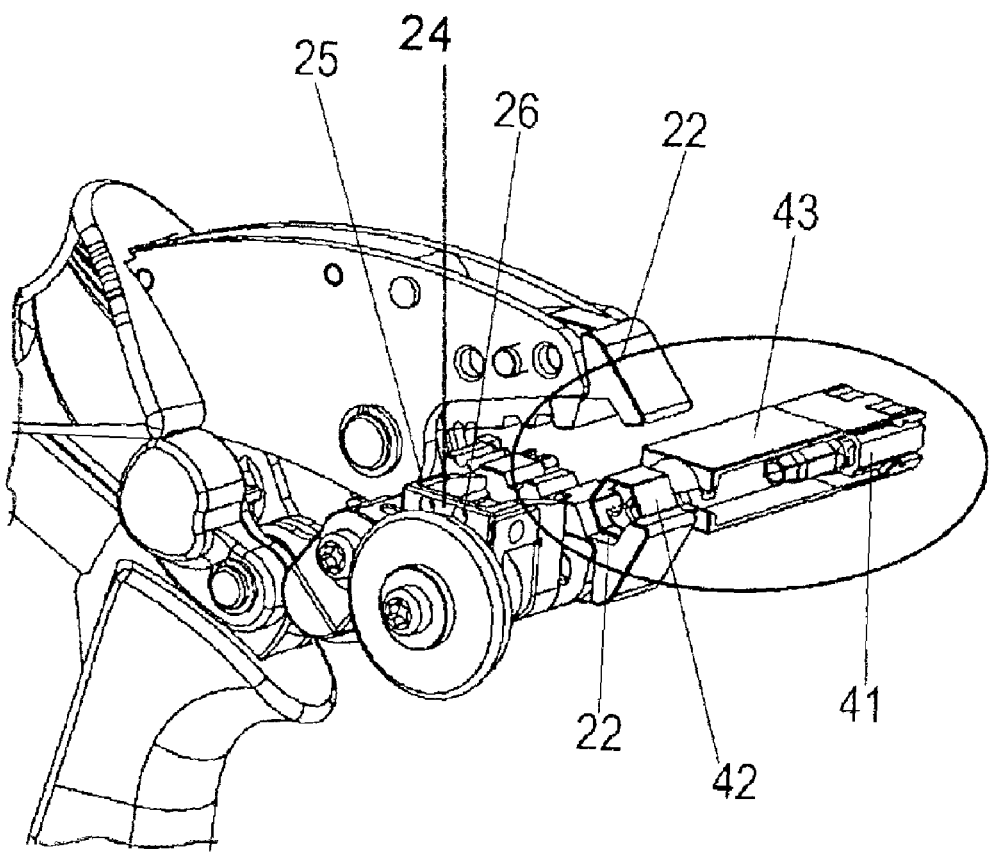

During the insertion of the two POF light-wave conductors 2 into plugs 40, 41, the stripped light-wave conductors 2 bump into a circulating slope 31 of the pressure disc 28 (FIG. 2*b*) and thus slide along this slope 31 so that the POF light-wave conductors are relatively easily bent for the alignment of the longitudinal axes of the conductors in the plugs 40, 41 in the seat area 23 (FIG. 3*d*).

It is advantageous that in front of the passage openings, there be placed, so to speak, a kind of obstacle by means of the pressure disc 28, which [obstacle] lies along the extension of the longitudinal axis of the conductors in the passage openings 25, 26 so that the light-wave conductors will have to be laid obliquely around that obstacle, something that causes a slight pre-stress, which in that way definitely improves the cut image.

Tension is applied to the light-wave conductors 2 as a result of the bending action, which, during the subsequent severing of light-wave conductors 2, brings about an outstanding cutting surface that does not have to be touched up by further polishing. The attenuation at the cutting site is extensively reduced already merely by means of the cut.

The user can thus cut off the POF light-wave conductors 2 in a easily handled fashion with the same closing motion that is used to crimp the plugs 40, 41. In the final analysis, the cut again runs at a right angle with respect to the light-wave conductor so that the light-wave conductor will end flush with the plug.

Shortly before the tool has been completely closed, the actuation lever 32 presses against lever 30, as a result of which, revolving knife 29 will cut the protruding light-wave conductors 2 off flush on plug 40 (FIG. 3h).

During the cutting-off process, rotary blade 29 is driven for which purpose there is provided a drive mechanism. In this case, the latter comprises at least one driving pinion gear 37 and one detent pawl 38 (FIG. 2b). By means of the pinion gear 37 and the detent pawl 38, rotary blade 29 is made to perform a rotary motion until the cut on the light-wave conductors 2 has been completed. To optimize the cutting surface on the light-wave conductors 2, the revolving blade 29 is made to perform a rotary motion (see also in this respect FIG. 2c).

Figure 2D:
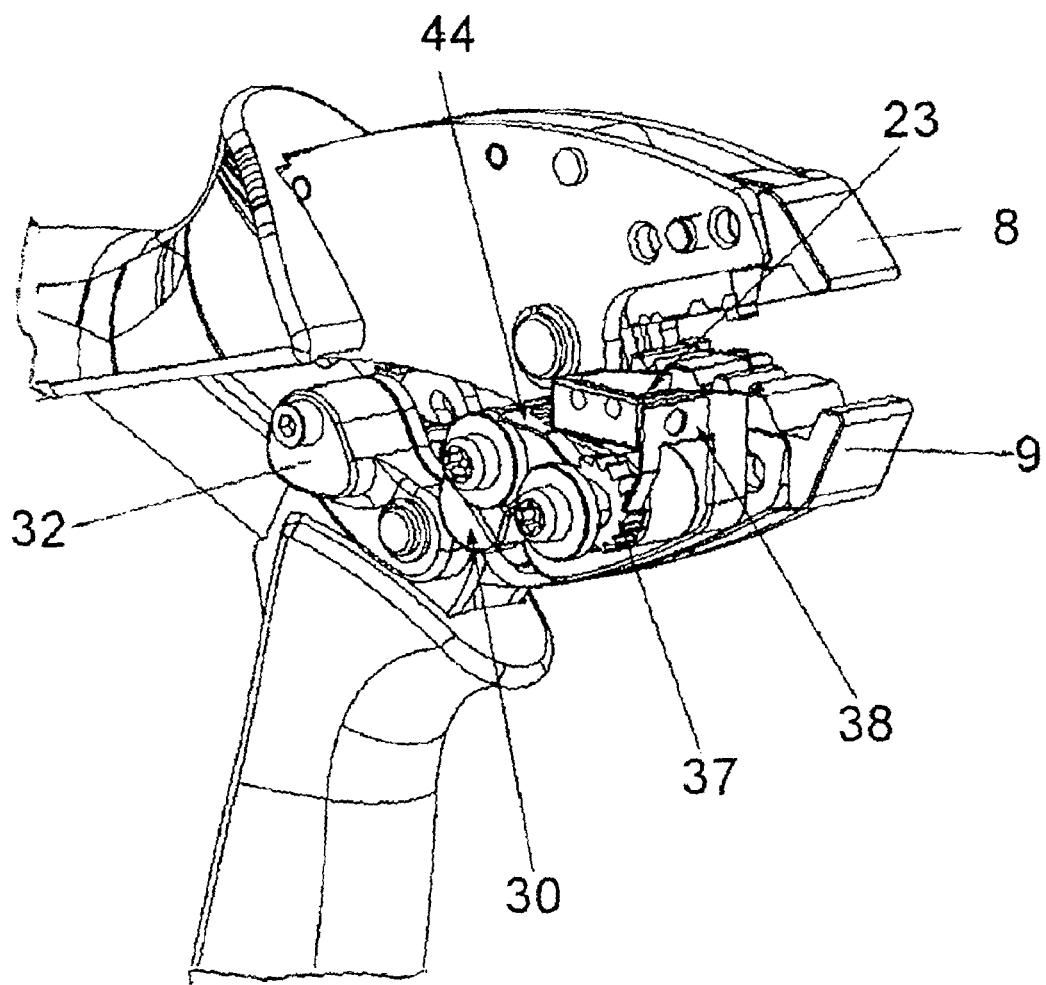

This is done, as shown in FIG. 2d, by means of the pivotal motion of lever arm 30, of the pinion gear and of the detent pawl 38 and a second detent pawl 44. The first detent pawl 38 is firmly connected with the seat area 23, the pinion gear 37 is firmly connected with knife 29, and both of them together are positioned in a rotary manner on an arbor.

If lever arm 30 is actuated, the first detent pawl 38 exerts pressure upon the detent pawl position 37 and thus causes knife 29 to perform a rotary motion. Detent pawl 44 prevents the crown gear 37 and thus also the revolving blade 29 from a reverse rotation, which has the advantageous consequence that the knife, during each cut, is used at another point.

Crimping die 22 for traction relief is made or arranged up front in the bit of the jaws so that the preassembled unit with the components including plugs 40, 41, housing 43, cable traction relief sleeve 42 can in a simple manner be inserted into and taken out of crimping die 22.

Figure 4:
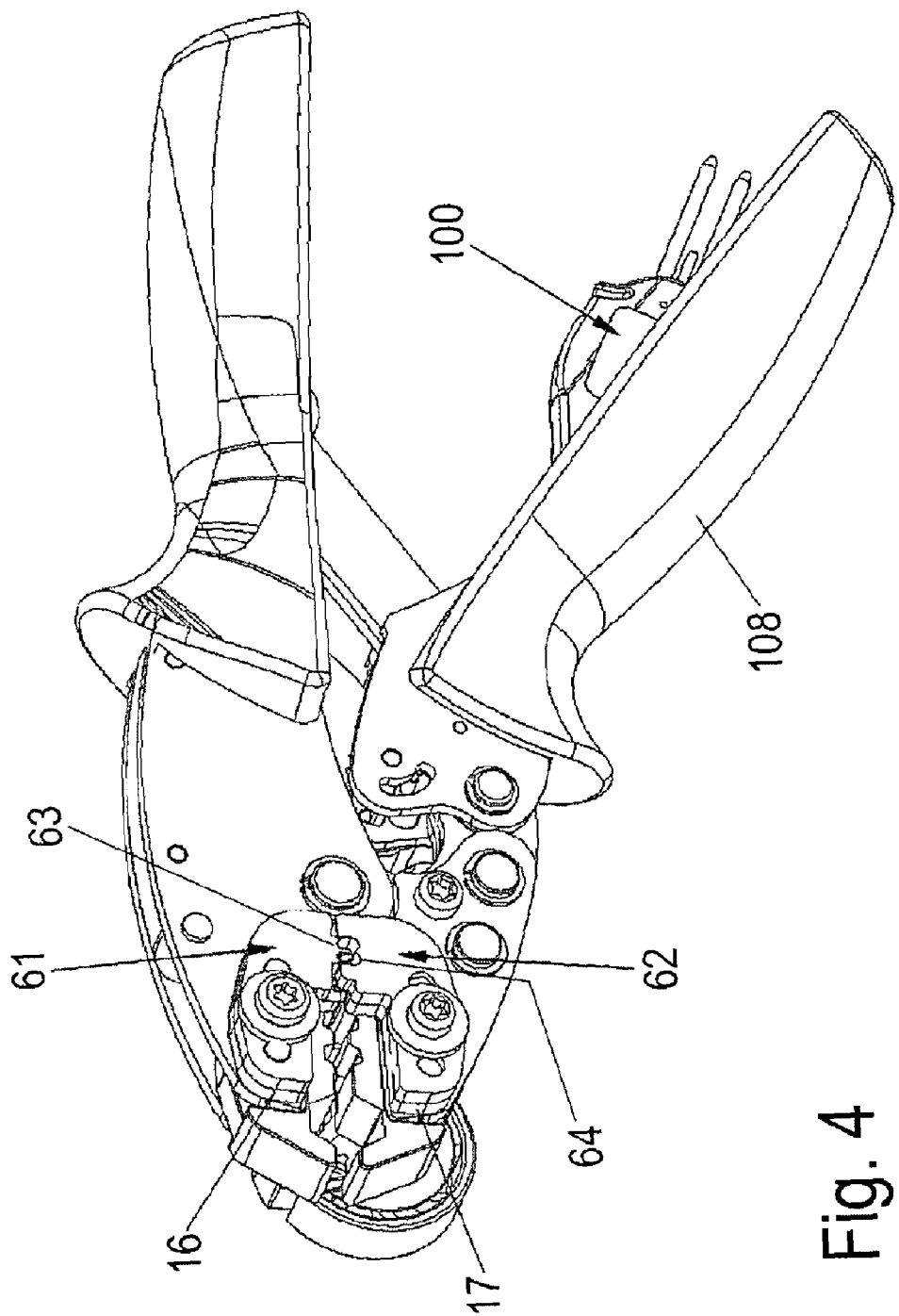
FIG. 4 is a perspective view of a modification of the crimping tool of FIGS. 1a and 1b.

According to a preferred embodiment in FIG. 4, guide plates 61, 62 are arranged for the better guidance of the light-wave conductors in the skinning station and for a more uniform notching of the insulation of the light-wave conductors next to the stripping knives 16, 17. During the stripping action, these guide plates 61, 62 are pressed against each other, all the way to recesses 63, 64, which form passage openings for the light-wave conductors 2. Guide plates 61, 62 improve the cutting quality during the skinning action in that they prevent any damage to the actual light-conducting fibers of the light-wave conductor. Moreover, the manual forces needed for pulling out the fiber is reduced and any damage to the fibers by the stripping knife 16, 17 is thus prevented.

FIG. 5 shows another advantageous detail of an exemplary embodiment of inventive manual pliers-type tool. This time, no pressure disc 28 is provided in order to secure the oblique position of the conductor during the cutting action. Instead, this oblique position is achieved by knife 29 and a guide 49. These manual arms are provided with a spring 46, which is supported on the pincer head. Here, spring 46 is a leaf spring, which is fixed on pincer head 5 with a screw 47 and a nut 48 and possibly a washer. It is arranged on the side of the pincer head 5 upon which is also arranged the length-cutting mechanism 27 for adjusting the length of the light-wave conductors 2. Spring 46 is so designed and arranged that during the closing of the pincers, it will press plugs 40, 41 in the direction of an abutment. Here, this abutment is constituted by stop 24.

In this way, we can make sure that the light-wave conductors 2 will have their length adjusted at the correct axial point because the plugs 41 in a defined manner come to rest against the abutment against which spring 46 presses them. Spring 46 thus has the effect of an automatic positioning aid for the plugs 41 (see also FIG. 6a). FIG. 5 also shows a protective cover 60, especially for the revolving blade 29.

Figure 6A:
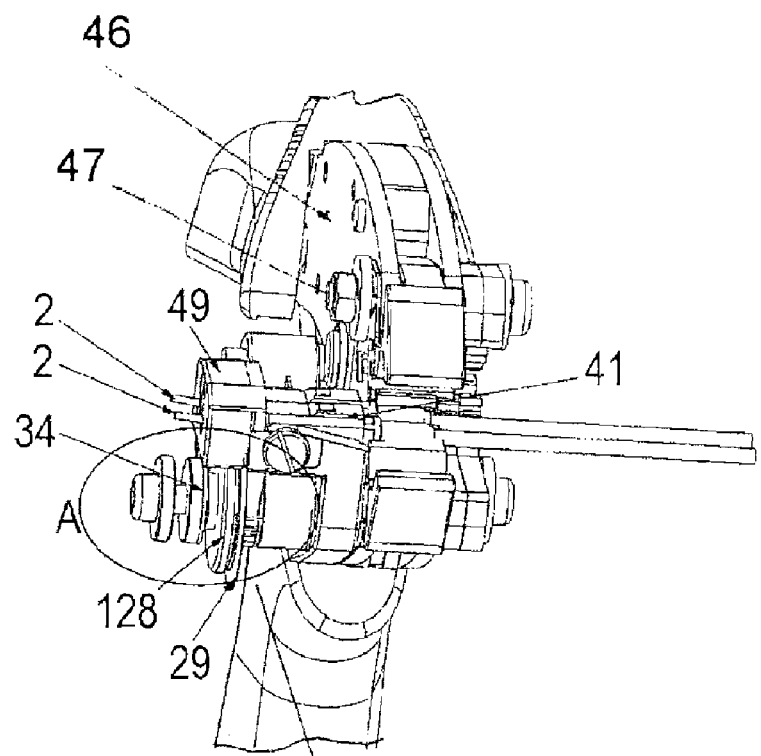
FIG. 6a is a detailed front perspective view of the apparatus of FIG. 4.
Figure 6B:
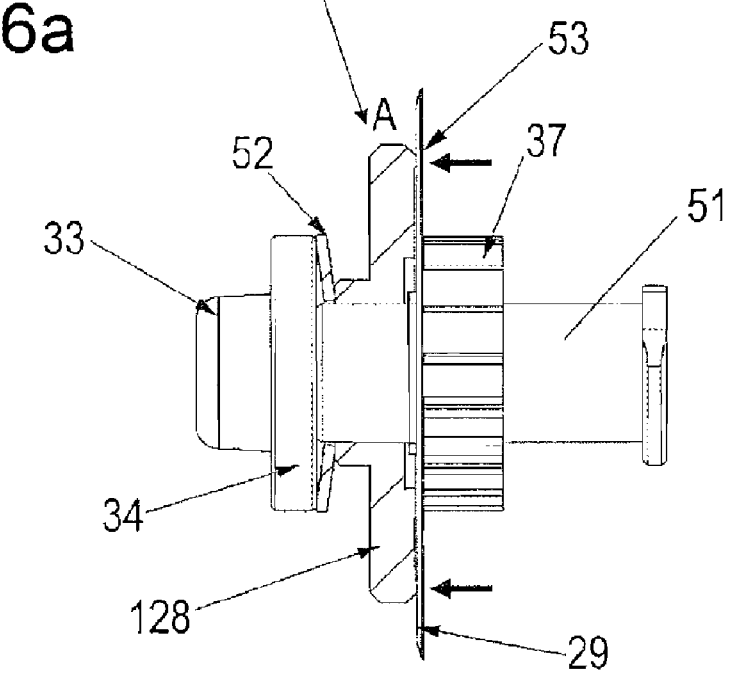

According to FIGS. 6a and 6b, the modified length-cutting mechanism again has a revolving blade 29, which is rotatably positioned and which can be driven and which, by virtue of its arrangement at the end of the pivotal lever arm 30, can be so moved along a circular arc segment that, with its help, we can sever any ends of the light-wave conductors 2 that still protrude during or after the crimping.

Lever arm 30 is swung as described in connection with FIG. 3h. Here, we can clearly see the crown gear 37 and a detent pawl 38 that rotate or drive the revolving blade. By virtue of its arrangement on lever arm 30 in a gap area (see FIG. 7) or in a recess 50, revolving blade 29 can be swung between seat 24 and guide 49.

Rotary blade 29 rests directly against pinion gear 37 and is coupled with it in a rotation-proof manner. On its side opposite the crown gear 37, the rotary blade 29 rests against a pressure disc 128. This pressure disc 128 preferably has a diameter that is only slightly smaller (preferably at most 20% smaller) than the diameter of cutting knife 29. A washer 34 and a spring, in this case, a spring washer 52, are preferably arranged between screw 33 and press-on disc 128. Press-on disc 128 preferably has an axial shoulder or catch 53, which serves as a contact area to the cutting knife 29. In that way, the cutting knife, as the revolving blade 29, is exactly guided in this area (FIG. 6b) and cannot evade during the cutting of the light-wave conductors 2.

Figure 7A:
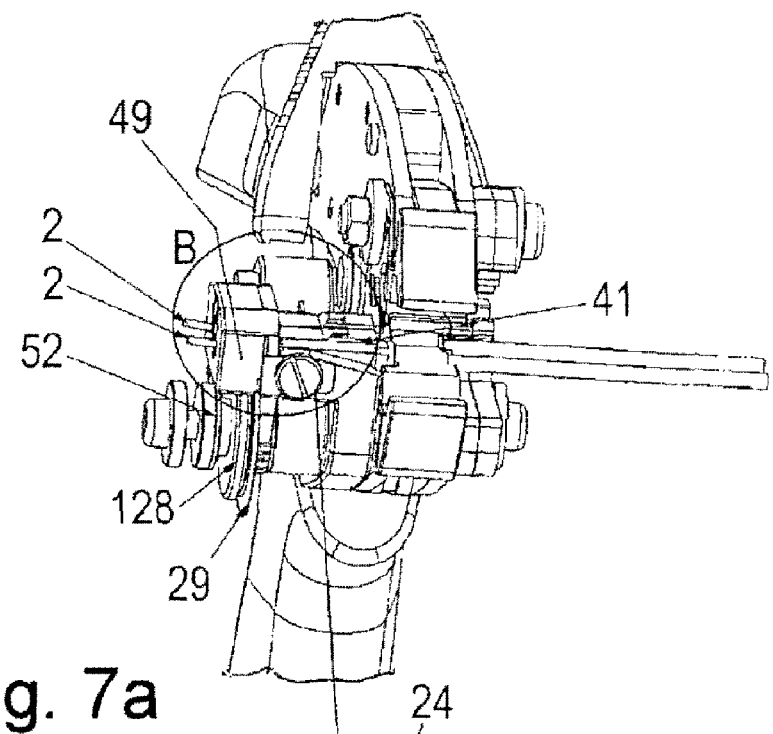
FIG. 7a is a detailed front perspective view of the apparatus of FIG. 4.
Figure 7B:
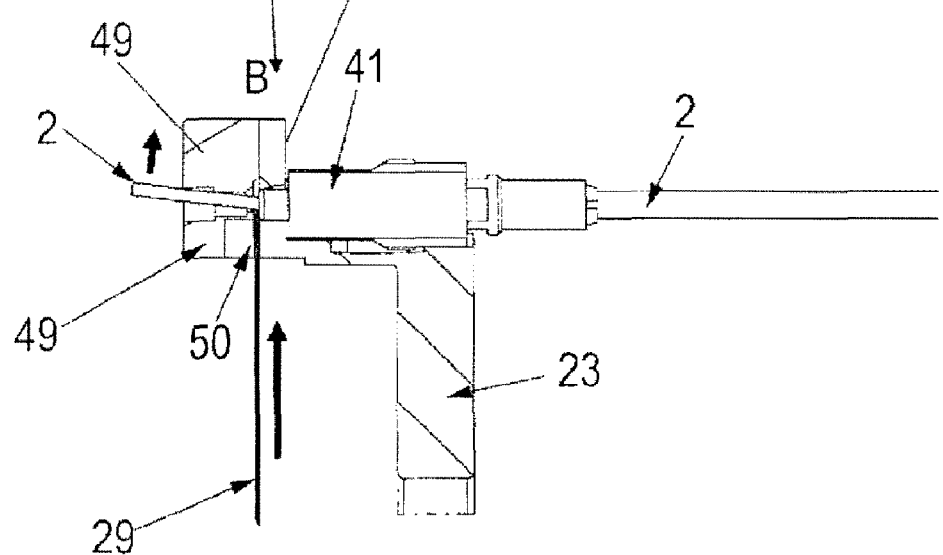

The actual cutting process is illustrated in FIGS. 7a and 7b. FIG. 7 shows how plugs 41, with the light-wave guides, rest in guide 49. Guide 49 is placed against the pincer head, preferably against the lower treatment jaw 9, and is attached upon the latter or it is molded upon the latter. Cutting knife 29 can be moved with relation to the fixed guide 49. For example, between stop 24 of seat area 23 and guide 49, a recess 50 is provided into which the cutting knife 29 extends during the cutting process. Guide 49 furthermore has a number of passage openings 55, 56 (or blind holes), which would correspond to the number of light-wave conductors 2 that are to be cut.

Passage openings 55, 56 are preferably so shaped that they become somewhat wider in the direction toward the free ends of the light-wave conductors 2. In that way, the actual fiber of the light-wave conductors 2 is forced a little bit obliquely upward by revolving blade 29 during the cutting process 2. This slight slanted position prevents the uncontrolled bending of light-wave conductors 2. In that way, again, we can facilitate easy bending under tension. The slanted position in that way, however, is nevertheless so dimensioned that the actual cut is still made precisely perpendicularly with respect to the longitudinal axis of the conductor.

Figure 8A:
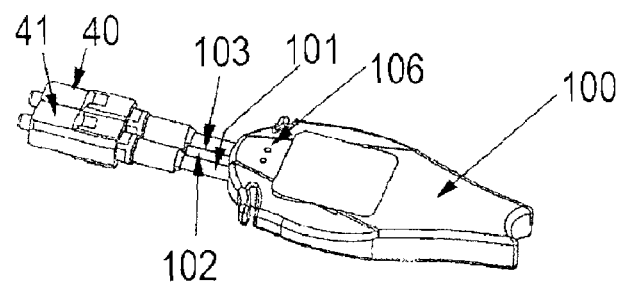
FIG. 8a is a perspective view of the monitoring device of the present invention.
Figure 8B:
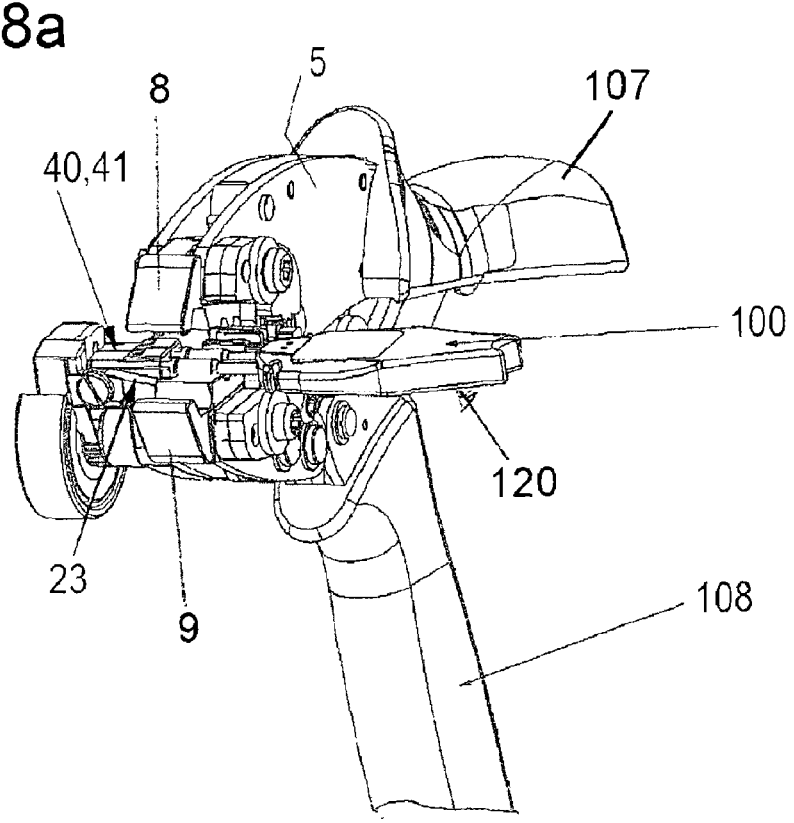
FIG. 8b illustrates the use of the monitoring apparatus of FIG. 8a with the crimping tool of FIG. 4.
Figure 9:
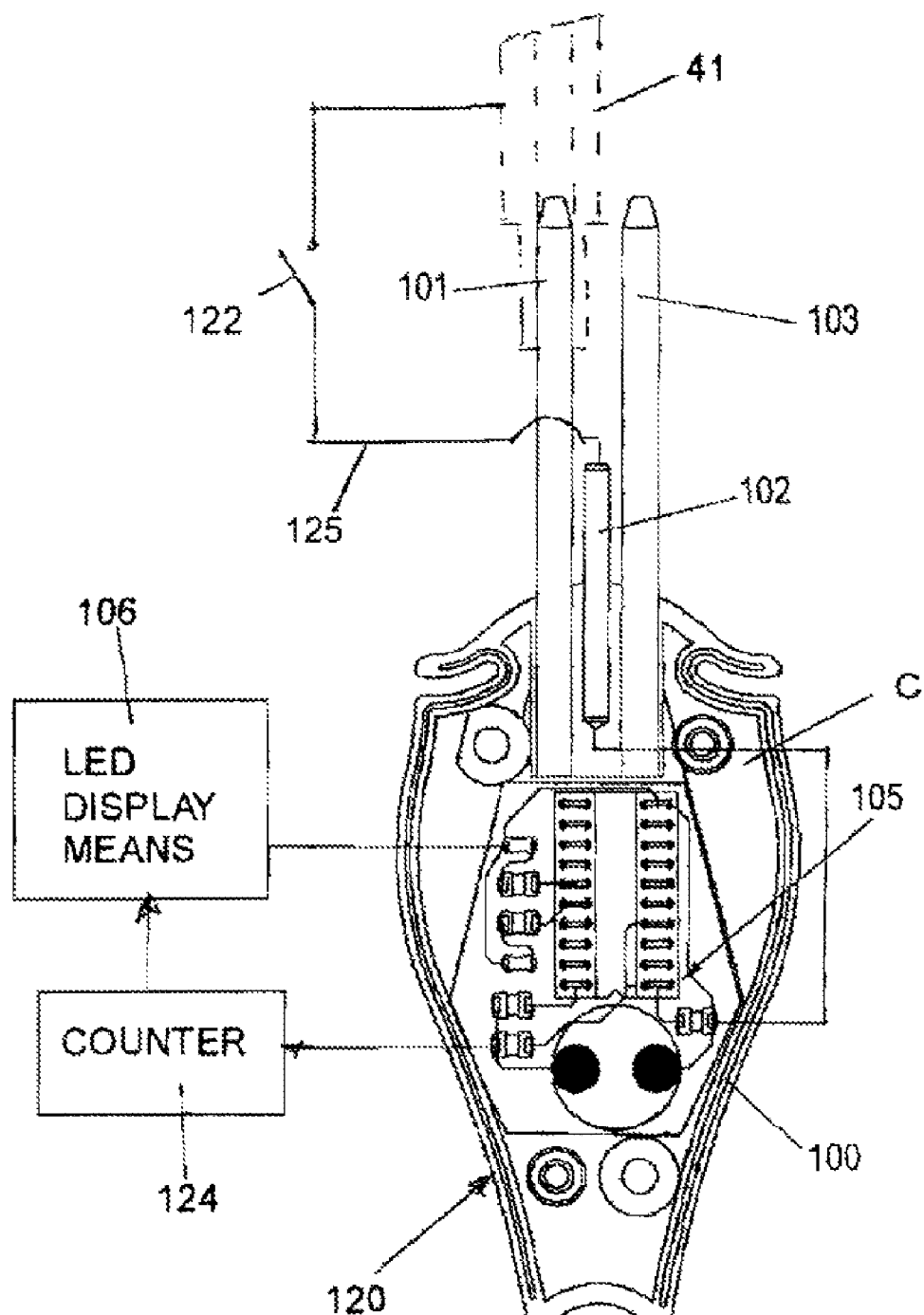
FIG. 9 is a top plan view of the monitoring apparatus of FIG. 8a, with certain parts removed.

Referring now to FIG. 8a, in accordance with the present invention, a transport device is provided for placing the plugs on the seat for crimping by the crimping dies. This transport device has a housing 100 out of which protrudes one or preferably several parallel pins 101, 102, 103. The housing can be assembled by means of two relatively flat, easily retained housing half-shells.

Pins 101, 102, 103 are aligned parallel to each other. Two of these pins, in this case, outer pins 101, 103, are longer than the third middle pin 102. The two outer pins are so dimensioned that in each case one of the plugs 40, 41 can be mounted concentrically on them (FIG. 8a). This arrangement facilitates a particularly simple positioning of these plugs on seat 23.

The transport device can be so shaped that it can be stored in a hollow space or in a recess of the gripper handle 107 (as shown in FIG. 4) if the tool is not in use. In that case, for example, it can be locked in a seat area of one gripper handle.

Preferably, the transport manipulating device is also designed as monitor for indicating the number of operations or cuts made by the tool. Here, it is advantageous to integrate an electronic circuit 105 into the chamber C of housing 100 and to arrange one or several display devices, such as an LED display 106, on housing 100. Preferably, electronic circuit 105 is so designed that as the pincers are partially displaced together to press the lugs 40 and 41 onto the seat 23, a switch 122 is closed, for example, an electrically conducting current path 125 between middle pin 102 and one of the plugs 40, 41 on one of the outer pins 101, 103 via a part of the treatment tool, which is electrically conducting. The electronic circuit registers this closing of the current path as a signal. The registered signals are added up by the counter 124 and the sum signal is stored. The sum signal furthermore is compared with one or several boundary values. The display device is triggered as a function of this comparison.

The monitoring tool pins are withdrawn from the plugs, and the light-wave conductors are inserted into the lugs, whereupon the handles are pivoted together to initially effect the crimping operation, and to subsequently produce the desired cutting off of the light-conductor ends.

Because the pincers at any rate, as a rule, are closed only when one or several plugs 40, 41 were laid into the seat with the insertion aid and because the pincers head was closed for a crimping process or a length-adjustment process, the total counter signal yields an information item that precisely, or at any rate mostly precisely, corresponds to the number of cuts that were made, or at any rate approximately so, if we assume that every time a plug is inserted, a cut will also follow as a rule.

If the signal exceeds a stored boundary value, then a corresponding information item can be put out. For example, an LED can light up or its color can change. The LED can also change its color several times and, for example, below a first boundary value can light up green; upon attainment of a second boundary value, it can light up yellow, something that indicates that knife 29 must be exchanged soon, and when a secondary boundary value is exceeded it can flash red, indicating that knife 29 must be changed now.

In this way, the knife quality can be controlled in a simple manner and without having to use a rather expensive meter mechanism. The counter can be set back at zero by a RESET, for example, a switch (not shown).

Concerning the description of preferred exemplary embodiments, it might be noted that some preferred embodiments will hereafter also be described in detail, but that the invention is not confined to these embodiments, rather that it can be designed in any varied ways within the context of the claims. In particular, terms such as "top," "bottom," "front" or "rear" should not be construed in any restrictive fashion, but rather refer only to the particular illustrated arrangement. Besides, when individual parts are explained, they—unless otherwise indicated—are basically also conceivable in several versions. The patent protection furthermore also covers functional reversals of the illustrated arrangements and processes as well as equivalent embodiments. While the present invention has been described in connection with light-wave conductors, the invention could be use for crimping on insulated wire conductors, as well.

While in accordance with the provisions of the Patent Statutes the preferred forms and embodiments of the invention have been illustrated and described, it will be apparent to those skilled in the art that changes may be made without deviating from the invention described above.

What is claimed is:

1. A monitoring device for monitoring the operation of a hand-held pliers-type crimping tool (1) that is operable to crimp one end of a generally hollow conductive plug terminal (40, 41) upon a conductor (2), and to cut the conductor to length, comprising:
   (a) a pliers-type crimping tool (1) including:
      (1) a pair of pivotally connected handles (107, 108);
      (2) a pair of crimping dies (21, 22) operable by said handles for displacement between an open spaced position and a closed crimping position; and
      (3) a support seat (23) mounted on one of said handles for supporting at least one plug terminal between said dies; and
   (b) a transport tool for transporting a plug terminal (41) to a seated position on said support seat, said transport tool including:
      (1) a housing (100) containing a chamber, and a wall opening communicating with said chamber;
      (2) electronic circuit means (105) including a counter (110) mounted in said chamber;
      (3) at least one transport pin (101) connected with said housing and extending outwardly from said wall opening, said transport pin being adapted for insertion within one end of the plug terminal, and for positioning the plug terminal in said support seat;
      (4) a conductive signal pin (102) connected at one end with said electronic circuit means and extending at its other end from said housing parallel with said transport pin; and
      (5) signal means (122) responsive to the displacement of said handles from said open position toward said closed position for sending a counting signal to said counter via said signal pin and said electronic circuit means.

2. A monitoring device as defined in claim 1, wherein the length of said transport pin is greater than the length of said signal pin.

3. A monitoring device as defined in claim 2, and further including a second transport pin (103) parallel with and arranged on the other side of said signal pin.

4. A monitoring device as defined in claim 3, and further including LED display means (106) mounted on said housing for displaying an output signal supplied by said counter.

5. A monitoring device as defined in claim 1, wherein one of said handles (108) contains a storage chamber for storing said transport tool.

6. A monitoring device as defined in claim 1, wherein said housing includes a number of separable sections.

* * * * *